United States Patent
Zhou et al.

(10) Patent No.: US 11,391,812 B2
(45) Date of Patent: Jul. 19, 2022

(54) METHOD AND DEVICE OF POSITIONING BASED ON WIRELESS SIGNAL INDEXES

(71) Applicant: OPPLE LIGHTING CO., LTD., Shanghai (CN)

(72) Inventors: Fei Zhou, Shanghai (CN); Bin Lin, Shanghai (CN); Jianming Xia, Shanghai (CN)

(73) Assignee: Opple Lighting Co., Ltd., Shanghai (CN)

(*) Notice: Subject to any disclaimer, the term of this patent is extended or adjusted under 35 U.S.C. 154(b) by 189 days.

(21) Appl. No.: 16/887,907

(22) Filed: May 29, 2020

(65) Prior Publication Data

US 2020/0363495 A1    Nov. 19, 2020

(51) Int. Cl.
*G01S 5/14* (2006.01)
*G01S 5/02* (2010.01)
*G01S 1/20* (2006.01)

(52) U.S. Cl.
CPC    *G01S 5/14* (2013.01); *G01S 1/20* (2013.01); *G01S 5/02213* (2020.05)

(58) Field of Classification Search
CPC . H04W 4/029; H04W 12/63; H04W 56/0065; H04W 64/00; H04W 72/0413; H04W 64/003; H04W 48/18; H04W 76/16; H04W 88/06; H04W 40/12; H04W 24/10; H04W 36/0085; H04W 36/08; H04W 36/00; H04W 36/0083; G05D 1/0278; G06F 16/29; H04B 17/318; H04B 10/60; H04B 17/309; H04B 17/382; G01S 5/14; G01S 1/20; G01S 5/02213
See application file for complete search history.

(56) References Cited

U.S. PATENT DOCUMENTS

| | | | |
|---|---|---|---|
| 2013/0210454 A1* | 8/2013 | O'Sullivan | G01S 5/0294 455/456.1 |
| 2018/0348335 A1* | 12/2018 | Lin | G01S 5/02 |
| 2019/0053013 A1* | 2/2019 | Markhovsky | G01S 5/10 |

* cited by examiner

*Primary Examiner* — Fred A Casca
(74) *Attorney, Agent, or Firm* — Arch & Lake LLP (57) ABSTRACT

A method and a device of positioning based on wireless signal indexes are provided by the present disclosure. The method takes the wireless signals sent by the target to be located and received by all the receivers as inputs in sequence, and considers influence of the wireless signal indexes received by the current receiver for a current time and for a previous time as well as the wireless signal indexes received by all the receivers in the predetermined historical duration during positioning calculation, so as to calculate a position offset value of the target to be located and finally obtain the current coordinate position of the target to be located.

19 Claims, 3 Drawing Sheets

METHOD AND DEVICE OF POSITIONING BASED ON WIRELESS SIGNAL INDEXES

CROSS-REFERENCE TO RELATED APPLICATIONS

This application is based upon and claims the priority of Chinese Patent Application No. 201910407072.0 filed on May 15, 2019, the entire content of which is hereby incorporated by reference herein for all purposes.

TECHNICAL FIELD

The present disclosure relates to the technical field of wireless signal positioning, in particular to method and device of positioning based on wireless signal indexes.

BACKGROUND

For positioning based on wireless signal indexes, methods may include: 1) positioning based on a received signal strength (RSS); 2) positioning based on a time of arrival (TOA) of an incoming wave; 3) positioning based on a time difference of arrival (TDOA) of an incoming wave; 4) positioning based on an angle-of-arrival (AOA) of a signal; 5) positioning based on an assisted global positioning system (A-GPS); 6) positioning based on an enhanced observed time difference (E-OTD); 7) positioning based on a cell of origin (COO); and 8) hybrid positioning.

SUMMARY

A method and a device of positioning based on wireless signal indexes is provided by the present disclosure.

According to one respect of the present disclosure, a method of positioning based on wireless signal indexes is provided.

The method may include reading a piece of received data in an order of wireless signal reception time from received data generated by one or more receivers that receive the wireless signals sent by a target to be located, and taking a receiver and a wireless signal index corresponding to the received data as a current receiver and the wireless signal index received by the current receiver for a current time; acquiring a wireless signal index when the current receiver receives the wireless signal sent by the target to be located for a previous time; and acquiring a wireless signal index when each of all the receivers receives the wireless signal sent by the target to be located every time in a predetermined historical duration before a time when the current receiver receives the wireless signal for the current time.

The method may also include calculating a current coordinate position of the target to be located according to a preset correlation between the wireless signal index and a distance between the target to be located and the receiver, a coordinate position of the current receiver, the wireless signal index received by the current receiver for the current time and the wireless signal index received by the current receiver for the previous time, the wireless signal indexes received by all the receivers in the predetermined historical duration, coordinate positions of these receivers and a coordinate position of the target to be located calculated for a previous time. The wireless signal may be broadcast to the one or more receivers by the target to be located at a specified period.

According to another respect of the present disclosure, a device of positioning based on wireless signal indexes is provided. The device may include: a current-receiver determination circuit that is configured to read a piece of received data in an order of wireless signal reception time from received data generated by one or more receivers that receive the wireless signals sent by a target to be located, and take a receiver and a wireless signal index corresponding to the received data as a current receiver and the wireless signal index received by the current receiver for a current time; and a wireless-signal-index acquisition circuit that is configured to acquire a wireless signal index when the current receiver receives the wireless signal sent by the target to be located for a previous time, and acquire a wireless signal index when each of all the receivers receives the wireless signal sent by the target to be located every time in a predetermined historical duration before the time when the current receiver receives the wireless signal for the current time;

The device may also include a target-coordinate-position calculation circuit that is configured to calculate a current coordinate position of the target to be located according to a preset correlation between the wireless signal index and a distance between the target to be located and the receiver, a coordinate position of the current receiver, the wireless signal indexes received by the current receiver for the current time and for the previous time, the wireless signal indexes received by all the receivers in the predetermined historical duration, coordinate positions of these receivers and a coordinate position of the target to be located calculated for a previous time. The wireless signal may be broadcast to the one or more receivers by the target to be located at a specified period.

It is to be understood that both the foregoing general description and the following detailed description are exemplary and explanatory only and are not restrictive of the present disclosure.

BRIEF DESCRIPTION OF THE DRAWINGS

The accompanying drawings are merely for the purpose of illustrating the examples and are not to be construed as any limitation to the present disclosure. The same reference numerals throughout the accompanying drawings are used to indicate the same parts. In the accompanying drawings.

DETAILED DESCRIPTION

Examples of the disclosure are described below with reference to the drawings in detail. Although the examples of the disclosure are shown in the drawings, it should be understood that the disclosure may be implement in various forms without limitation of the examples elaborated here. Instead, these examples are provided to make the disclosure understood more thoroughly and completely deliver the scope of the disclosure to those skilled in the art.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

For positioning based on wireless signal indexes, it is difficult to develop positioning algorithms that are able to be applicable for discrete wireless signal indexes. For example, in a certain scene, although a mobile station to be located transmits wireless signals to several receivers simultaneously, however, after the signals are forwarded to a position calculating function (PCF) circuit by a network receiver, these signals naturally take a discrete form with random times of arrival, and some of the receivers even have high signal arrival frequencies while some of the receivers have signals with arrival time exceeding expectations. The current positioning algorithm is unable to work normally in such a scene. Therefore, there is a need for a method of filtering and correlating these discrete wireless signals to locate the mobile station.

Figure 1:
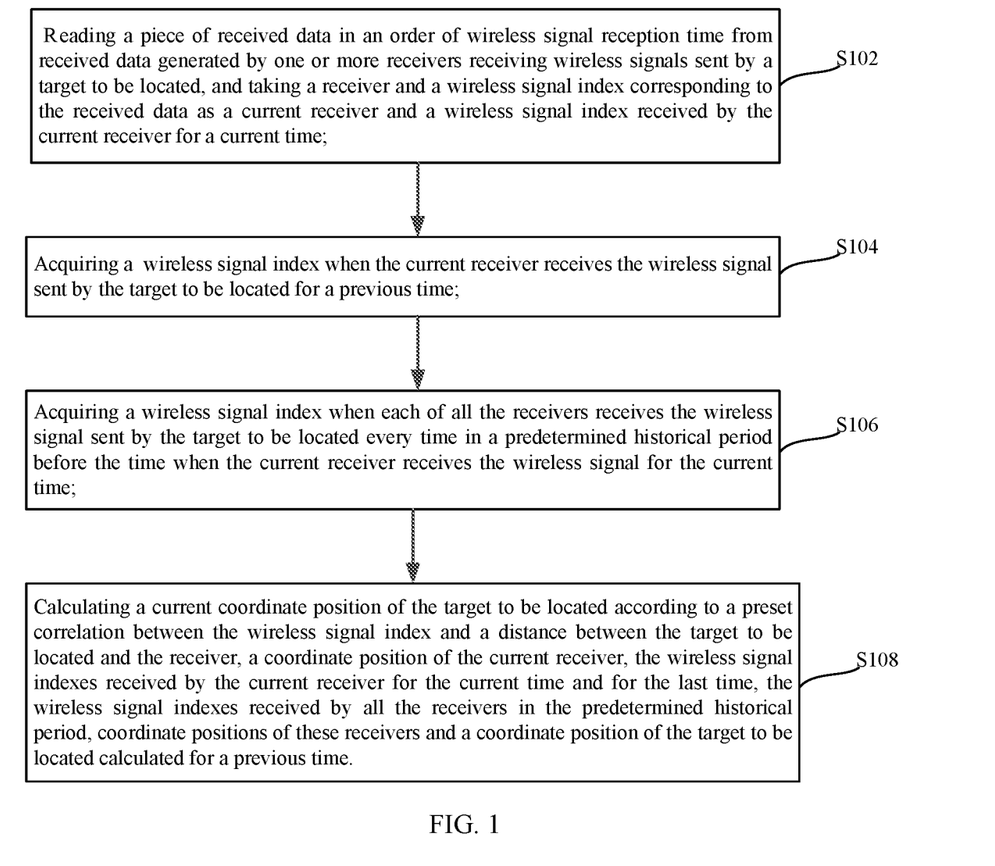
FIG. 1 shows a flow chart of a method of positioning based on wireless signal indexes according to one example of the present disclosure.

In order to solve the above-mentioned technical problems, an example of the present disclosure provides a method of positioning based on wireless signal indexes. FIG. 1 shows a flow chart of a method of positioning based on wireless signal indexes according to one example of the present disclosure. Referring to FIG. 1, the method may at least include the following steps S102 to S108:

step S102, reading a piece of received data in an order of reception time from received data generated by one or more receivers receiving the wireless signals sent by a target to be located, and taking a receiver and a wireless signal index corresponding to the received data as a current receiver and a wireless signal index received by the current receiver for a current time;

step S104, acquiring a wireless signal index when the current receiver receives the wireless signal sent by the target to be located for a previous time;

step S106, acquiring a wireless signal index when each of all the receivers receives the wireless signal sent by the target to be located every time in a predetermined historical duration before the time when the current receiver receives the wireless signal for the current time; and step S108, calculating a current coordinate position of the target to be located according to a preset correlation between the wireless signal index and a distance between the target to be located and the receiver, a coordinate position of the current receiver, the wireless signal indexes received by the current receiver for the current time and for the previous time, the wireless signal indexes received by all the receivers in the predetermined historical duration, coordinate positions of these receivers and a coordinate position of the target to be located calculated for a previous time.

In the examples of the present disclosure, the wireless signal is broadcast to the one or more receivers by the target to be located at a specified period. These receivers have the known coordinate positions, and every time receiving the wireless signal sent by the target to be located, each receiver immediately forwards the generated received data of the wireless signal to a big data pipeline, a memory, a calculation function device, or the like, to be gathered for subsequent calculation. In this way, the receiver is only required to consume a small amount of power in the positioning process, which greatly prolongs the service life and a replacement period of a battery of the receiver. The target to be located may be configured as a mobile terminal, a wearable device, or the like. The specified period at which the target to be located broadcasts the wireless signal may be set according to factors such as a calculation capability of a corresponding calculation function device, a positioning precision requirement, or the like, for example, 100 ms to 200 ms.

The method of positioning based on the wireless signal indexes according to the example of the present disclosure, takes the wireless signals sent by the target to be located and received by all the receivers as inputs in sequence, and comprehensively considers influence of the wireless signal indexes received by the current receiver for the current time and for the previous time as well as the wireless signal indexes received by all the receivers in the predetermined historical duration during positioning calculation, so as to obtain the current coordinate position of the target to be located. The solution according to the example of the present disclosure is applicable for both discrete wireless signals and continuous wireless signals, and solves the problem that a positioning method based on wireless signal indexes in a prior art is unable to be applicable for a discrete wireless signal scene. Meanwhile, the solution according to the example of the present disclosure is easy to implement, has high positioning precision and is particularly applicable for an indoor Bluetooth positioning application.

Each piece of received data mentioned in the above step S102 may contain a unique identification, a reception time of the wireless signal and the wireless signal index of the corresponding receiver. During each calculation, each piece of received data may be read from the gathered received data in an order of wireless signal reception time, and the current receiver is determined according to the unique identification of the receiver in the read received data.

Further, in step S104, according to the unique identification of the determined current receiver, the wireless signal index received by the current receiver for the previous time is looked up and acquired in the gathered received data.

In step S106, the reception time of the wireless signal in the received data read in step S102 is taken as a current time point, and the received data in the predetermined historical duration before the current time point is captured from the above-mentioned gathered received data, such that the wireless signal indexes received by all the receivers in the predetermined historical duration are obtained from the captured received data. The predetermined historical duration may be set within the range of 1 s to 5 s, specifically dependent on the broadcast interval of the wireless signal, the number of the receivers, the calculation capability of the calculation device, or the like. Preferably, the predetermined historical duration may be set within the range of 1 s to 3 s, thereby ensuring that the amount of the data in the predetermined historical duration is within a reasonable range under the premise of sufficiently considering the wireless signal indexes received by other receivers in the vicinity.

In step S108, the coordinate position of the current receiver and the coordinate positions of all the relevant receivers in the predetermined historical duration may be obtained in the following two ways.

First, each piece of received data contains the coordinate position of the corresponding receiver, such that the coordinate position of the corresponding receiver may be directly read from the received data according to the unique identification of the receiver.

Second, a correspondence table of the unique identification of the receiver and the coordinate position of the receiver may be pre-stored in the calculation device or memory, such that the coordinate position of the corresponding receiver may be looked up from the pre-stored correspondence table according to the unique identification of the receiver.

After calculated, the current coordinate position of the target to be located is output, then a next position calculation is started, and the cycle is repeated until a positioning function is closed or the position of the target to be located is not changed within a certain time.

In an example, a received signal strength indication (RSSI) of the wireless signal may be used as the wireless signal index.

In this situation, the preset correlation between the wireless signal index and the distance between the target to be located and the receiver includes a minimum distance between the target to be located and the receiver, an RSSI upper limit value corresponding to the minimum distance, a maximum distance between the target to be located and the receiver as well as a RSSI lower limit value corresponding to the maximum distance, and the minimum distance is set to zero. The maximum distance, the RSSI upper limit value and the RSSI lower limit value are related to transmission power and frequency of the wireless signal.

Further, in order to guarantee validity of the data, before the calculation, the received data generated by the one or more receivers receiving the wireless signals sent by the target to be located may also be filtered to discard the received data with an RSSI value greater than the RSSI upper limit value or less than the RSSI lower limit value. Specifically, the RSSI value of each piece of received data is compared with the RSSI upper limit value and the RSSI lower limit value, and the RSSI values greater than the RSSI upper limit value or less than the RSSI lower limit value are all regarded as abnormal values and discarded. In practical applications, this data filtering step may be executed on either a receiver side or a calculation device side, which is not limited by the present disclosure.

In an example, step S108 may be embodied as the following steps:

firstly, calculating a first position offset of the target to be located caused by the RSSI received by the current receiver for the current time according to the preset correlation between the wireless signal index and the distance between the target to be located and the receiver, the coordinate position of the current receiver, the RSSI received by the current receiver for the current time, the coordinate position of the target to be located calculated for the previous time and a preset weight of influence of the RSSI received by the current receiver for the current time on the position offset of the target to be located;

secondly, calculating a second position offset of the target to be located caused by the RSSI received by the current receiver for the previous time according to the coordinate position of the current receiver, the RSSIs received by the current receiver for the current time and for the previous time, the coordinate position of the target to be located calculated for the previous time and a preset weight of influence of the RSSI received by the current receiver for the previous time on the position offset of the target to be located;

thirdly, calculating a third position offset of the target to be located caused by the RSSIs received by all the receivers in the predetermined historical duration according to the preset correlation between the wireless signal index and the distance between the target to be located and the receiver, the RSSIs received by all the receivers in the predetermined historical duration, the coordinate positions of these receivers, the coordinate position of the target to be located calculated for the previous time, and a preset weight of influence of the RSSIs received by all the receivers in the predetermined historical duration on the position offset of the target to be located;

fourthly, summing the first, second and third position offsets to obtain a current position offset of the target to be located; and fifthly, summing the coordinate position of the target to be located calculated for the previous time and the current position offset to obtain the current coordinate position of the target to be located.

By properly setting different weights of influence of the wireless signal indexes received by the current receiver for the current time and for the previous time as well as the wireless signal indexes received by all the receivers in the predetermined historical duration on displacement of the target to be located, the position offset of the target to be located is calculated to further calculate the current coordinate position of the target to be located, which may further improve the positioning precision.

Further preferably, an equation is constructed for the calculations of the first, second and third position offsets by sufficiently considering the inverse correlation between the RSSI and the distance and a decay law of the RSSI, and the above-mentioned first to fifth steps may be further implemented as follows.

In the first step, the first position offset (delta_x_1, delta_y_1) of the target to be located caused by the RSSI received by the current receiver for the current time is calculated according to the following equation (1):

$$\text{delta}\_x\_1 = (\text{base1}\_x - x) \times ((\text{RSSI upper limit value} - \text{current\_RSSI})/(\text{RSSI upper limit value} - \text{RSSI lower limit value}))^2 \times w1,$$

$$\text{delta}\_y\_1 = (\text{base1}\_y - y) \times ((\text{RSSI upper limit value} - \text{current\_RSSI})/(\text{RSSI upper limit value} - \text{RSSI lower limit value}))^2 \times w1.$$

In the above equation (1), base1_x and base1_y are the coordinate position of the current receiver, x and y are the coordinate position of the target to be located calculated for the previous time, and w1 is the weight of influence of the RSSI received by the current receiver for the current time on the position offset of the target to be located.

In the second step, the second position offset (delta_x_2, delta_y_2) of the target to be located caused by the RSSI received by the current receiver for the previous time is calculated according to the following equation (2):

$$\text{delta}\_x\_2 = (\text{base1}\_x - x) \times (\text{current\_RSSI} - \text{previous\_RSSI}) \times w2,$$

$$\text{delta}\_y\_2 = (\text{base1}\_y - y) \times (\text{current\_RSSI} - \text{previous\_RSSI}) \times w2.$$

The above equation (2) has the same meanings of base1_x, base1_y, x and y as equation (1), and w2 is the weight of influence of the RSSI received by the current receiver for the previous time on the position offset of the target to be located. The second position offset is similar to an effect of an acceleration rate.

In the third step, the third position offset (delta_x_3, delta_y_3) of the target to be located caused by the RSSIs received by all the receivers in the predetermined historical duration is calculated according to the following equation (3):

delta_x_#=(base#_x−x)×((RSSI upper limit value−RSSI_#)/(RSSI upper limit value−RSSI lower limit value))$^2$×w1, delta_y_#=(base#_y−y)×((RSSI upper limit value−RSSI_#)/(RSSI upper limit value−RSSI lower limit value))$^2$×w1, delta_x_3=(sum of all delta_x_#)×w3, delta_y_3=(sum of all delta_y_#)×w3.

In the above equation (3), delta_x_#, delta_y_# and RSSI_# are the coordinate position of a receiver corresponding to each piece of received data and the RSSI value received by the receiver in the predetermined historical duration, x and y are the coordinate positions of the target to be located calculated for the previous time, and w3 is the weight of influence of the RSSIs received by all the receivers in the predetermined historical duration on the position offset of the target to be located. The third position offset is similar to an effect of a combination of acting forces, and considers influence of the intensity of RSSIs received by other receivers in the vicinity on the displacement of the target to be located.

In the fourth step, the current position offset (delta_x, delta_y) of the target to be located is calculated according to the following equation (4):

delta_x=delta_x_1+delta_x_2+delta_x_3, delta_y=delta_y_1+delta_y_2+delta_y_3.

Finally, in the fifth step, the current coordinate position (x+delta_x, y+delta_y) of the target to be located is calculated, and the current coordinate position is output to obtain a new position of the target to be located. X and y are the coordinate position of the target to be located calculated for the previous time.

Values of the weights w1, w2 and w3 affect the positioning precision significantly. A large number of test results show that in a case where w1 is set within the range of 0.5 to 0.7, w2 is set within the range of 0.004 to 0.007, and w3 is set within the range of 0.04 to 0.06, the influence of the wireless signal indexes received by the current receiver for the current time and for the previous time as well as the wireless signal indexes received by all the receivers in the predetermined historical duration on the displacement of the target to be located may be fully considered and balanced effectively, thus obtaining a high positioning precision.

In addition, during the calculation, the RSSI received by the current receiver for the current time may be an RSSI received by the current receiver for the first time, and in this situation, there is no RSSI data received by the current receiver for the previous time. In this case, the second position offset is set to zero directly in the second step.

When the coordinate position of the target to be located is calculated for the first time, the target to be located has no historical coordinate data; that is, there is no coordinate position of the target to be located calculated for the previous time. In this case, the sum of the coordinate position of the current receiver and a random coordinate offset (which may be referred to as a random coordinate position) may be taken as the current coordinate position of the target to be located calculated for the first time, the random coordinate position may be directly output as an initial coordinate position of the target to be located, and then the next calculation may be performed. The random coordinate offset is determined according to the wireless signal index received by the current receiver for the current time and the preset correlation between the wireless signal index and the distance between the target to be located and the receiver.

In the case where the RSSI is used as the wireless signal index and the correlation between the RSSI and the distance is preset, the random coordinate position may be obtained by: firstly, calculating a circle radius r=((RSSI upper limit value−current_RSSI)/(RSSI upper limit value−RSSI lower limit value))×maximum distance when the coordinate position of the target to be located is calculated for the first time, so as to obtain a circle with the coordinate position (base1_x, base1_y) of the current receiver as a center of the circle and the radius of r; and then, selecting a coordinate position at the circle randomly as the current coordinate position of the target to be located.

Specifically, a calculation process of the coordinate position which is selected randomly is as follows: firstly, selecting a point at the circle randomly, and determining an included angle $\alpha_{random}$ formed by a radius passing through the point and an x axis of a coordinate system; then, calculating a relative distance between the point and a center of the circle: delta_x_random=r×cos($\alpha_{random}$), and delta_y_random=r×sin($\alpha_{random}$); further, calculating the coordinate position (x_random, y_random) of the point: x_random=base1_x+delta_x_random, and y_random=base1_y+delta_y_random; and finally, taking the coordinate position (x_random, y_random) of the point as the current coordinate position of the target to be located, and outputting the current coordinate position (x_random, y_random) directly as the initial coordinate position (x, y) of the target to be located.

The initial coordinate position of the target to be located obtained in this way may coincide with an actual position of the target to be located, or may be located just at the farthest end in a moving direction of the target to be located (i.e., farthest away from the actual position of the target to be located). In either case, a deviation may be corrected as the calculation is repeated, thereby converging to a desired coordinate position rapidly. Certainly, the longer a distance between the initial coordinate position and the actual position of the target to be located, the longer a time is required for convergence.

Various implementations of each link of the example shown in FIG. 1 are introduced above, and an implementation process of the method of positioning based on the wireless signal indexes according to an example of the present disclosure will be described in detail below.

In the present example, the target to be located is configured as a mobile station, and three receivers j1, j2, and j3 are adopted to receive the wireless signals sent by the mobile station, and have the coordinate positions (base_x1, base_y1), (base_x2, base_y2) and (base_x3, base_y3) respectively. The mobile station broadcasts the wireless signal every 100 ms. The RSSI is adopted as the wireless signal index, and the correlation between the RSSI and the distance between the mobile station and the receiver is preset as follows: RSSI=−60 (i.e., the RSSI upper limit value) in the case where the mobile station and the receiver have a distance of zero (i.e., the minimum distance); RSSI=−100 (i.e., the RSSI lower limit value) in the case the mobile station and the receiver have a distance of 5 m (i.e., the maximum distance). The predetermined historical duration is set to 1s. Each receiver generates a piece of received data every time receiving the wireless signal sent by the mobile station, and forwards the received data to the big data pipeline for collection, and the received data includes the reception time of the wireless signal, the coordinate position of the receiver, the RSSI value and the unique identification of the receiver. The multiple pieces of received data collected are schematically listed below.

| Number | Received Data |
|---|---|
| 1 | 8.000", (base_x1, base_y1), −80, j1 |
| 2 | 8.025", (base_x2, base_y2), −89, j2 |
| 3 | 8.060", (base_x3, base_y3), −95, j3 |
| 4 | 8.101", (base_x2, base_y2), −80, j2 |
| 5 | 8.125", (base_x1, base_y1), −90, j1 |
| ... | ... |
| n | 9.010", (base_x2, base_y2), −70, j2 |
| ... | ... |

In the above-mentioned received data, " indicates "second", and for example, 8.025" indicates a time of 8 seconds and 25 milliseconds. The method of positioning based on the wireless signal indexes according to the present example will be described below based on the above-mentioned data.

When the coordinate position of the mobile station is calculated for the first time, a first piece of data (8.000", (base_x1, base_y1), −80, j1) is read from the above-mentioned received data, the current receiver j1 is determined according to the read first piece of data, and the coordinate position (base_x1, base_y1) and the current_RSSI value of −80 of the current receiver j1 are obtained from the read first piece of data. According to the preset correlation between the RSSI and the distance between the mobile station and the receiver, the current_RSSI value of −80, the RSSI upper limit value of −60, the RSSI lower limit value of −100 and the maximum distance of 5 m are substituted into r=((RSSI upper limit value−current_RSSI)/(RSSI upper limit value−RSSI lower limit value))×maximum distance, so as to calculate the circle radius 1=2.5 m, thereby obtaining the circle with (base_x1, base_y1) as the center of the circle and the radius r=2.5 m; further, a coordinate position is selected at the circle randomly as the current coordinate position (i.e., the initial coordinate position (x, y)) of the mobile station, the initial coordinate position (x, y) is output, and the next position calculation is performed. The coordinate position which is selected randomly has a specific calculation process as described above.

When the coordinate position of the mobile station is calculated for the second time, a second piece of data (8.025", (base_x2, base_y2), −89, j2) is read from the above-mentioned received data, the current receiver j2 is determined according to the read second piece of data, and the coordinate position (base_x2, base_y2) and the current_RSSI value of −89 of the current receiver j2 are obtained from the read second piece of data. The coordinate position and the RSSI value of the receiver corresponding to each piece of received data in the predetermined historical duration (1s) before the time (8.025") when the wireless signal is received by the current receiver j2 for the current time are acquired. In the present example, only one piece of received data exists in the predetermined historical duration in the calculation, and the corresponding coordinate position and RSSI value of the receiver j1 are (base_x1, base_y1) and −80 respectively.

The coordinate position (base_x2, base_y2) and the current_RSSI value of −89 of the current receiver j2, the initial coordinate position (x, y) of the mobile station, the RSSI upper limit value of −60, the RSSI lower limit value of −100, as well as the value of the weight w1 (in the present example, w1=0.55) of the influence are substituted into the above-mentioned equation (1) to calculate the first position offset (delta_x_1, delta_y_1). Because the RSSI received by the current receiver j2 for the current time serves as the RSSI received by j2 for the first time, the second position offset (delta_x_2, delta_y_2) is set to zero directly. The coordinate position (base_x1, base_y1) and the RSSI value of −80 of the receiver j1, the initial coordinate position (x, y) of the mobile station, the RSSI upper limit value of −60, the RSSI lower limit value of −100, as well as the values of the weights w1 and w3 (in the present example, w3=0.05) of the influence are substituted into the above-mentioned equation (3) to calculate the third position offset (delta_x_3, delta_y_3). Further, the first, second and third position offsets are summed to calculate the current position offset (delta_x, delta_y) of the mobile station. Finally, the initial coordinate position (x, y) and the current position offset (delta_x, delta_y) of the mobile station are summed to calculate the current coordinate position (x+delta_x, y+delta_y) of the mobile station, and the current coordinate position is output as the new initial coordinate position (x, y) of the mobile station.

When the coordinate position of the mobile station is calculated for the third time, a third piece of data (8.060", (base_x3, base_y3), −95, j3) is read from the above-mentioned received data, the current receiver j3 is determined according to the read third piece of data, and the coordinate position (base_x3, base_y3) and the current_RSSI value of −95 of the current receiver j3 are obtained from the read third piece of data. The coordinate position and the RSSI value of the receiver corresponding to each piece of received data in the predetermined historical duration (1s) before the time (8.060") when the wireless signal is received by the current receiver j3 for the current time are acquired. In the present example, two pieces of received data exist in the predetermined historical duration in the calculation, the corresponding coordinate position and RSSI value of the receiver j1 are (base_x1, base_y1) and −80 respectively, and the corresponding coordinate position and RSSI value of the receiver j2 are (base_x2, base_y2) and −89 respectively. The third calculation process of the coordinate position is similar to the second calculation process of the coordinate position, and is not repeated herein.

When the coordinate position of the mobile station is calculated for the fourth time, a fourth piece of data (8.101", (base_x2, base_y2), −80, j2) is read from the above-mentioned received data, the current receiver j2 is determined according to the read fourth piece of data, and the coordinate position (base_x2, base_y2) and the current_RSSI value of −80 of the current receiver j2 are obtained from the read fourth piece of data. The RSSI value received by the current receiver j2 for the previous time (i.e., the RSSI value of −89 in the second piece of received data) is further acquired. The coordinate position and the RSSI value of the receiver corresponding to each piece of received data in the predetermined historical duration (1s) before the time (8.101") when the wireless signal is received by the current receiver j2 for the current time are acquired. In the present example, three pieces of received data exist in the predetermined historical duration in the calculation, the corresponding coordinate position and RSSI value of the receiver j1 are (base_x1, base_y1) and −80 respectively, the corresponding coordinate position and RSSI value of the receiver j2 are (base_x2, base_y2) and −89 respectively, and the corresponding coordinate position and RSSI value of the receiver j3 are (base_x3, base_y3) and −95 respectively.

The coordinate position (base_x2, base_y2) and the current_RSSI value of −80 of the current receiver j2, the current coordinate position (i.e., the new initial coordinate position (x, y)) of the mobile station calculated for the third time, the RSSI upper limit value of −60, the RSSI lower limit value of −100, as well as the value of the weight w1 of the influence are substituted into the above-mentioned equation (1) to calculate the first position offset (delta_x_1, delta_y_1). The coordinate position (base_x2, base_y2) of the current receiver j2, the current_RSSI value of −80 and the previous_RSSI value of −89 of the current receiver j2, the current coordinate position (x, y) of the mobile station calculated for the third time, as well as the value of the weight w2 (in the present example, w2=0.006) of the influence are substituted into the above-mentioned equation (2) to calculate the second position offset (delta_x_2, delta_y_2). The coordinate position (base_x1, base_y1) and the RSSI value of −80 of the receiver j1, the coordinate position (base_x2, base_y2) and the RSSI value of −89 of the receiver j2, the coordinate position (base_x3, base_y3) and the RSSI value of −95 of the receiver j3, the new initial coordinate position (x, y) of the mobile station, the RSSI upper limit value of −60, the RSSI lower limit value of −100, as well as the values of the weights w1 and w3 of the influence are substituted into the above-mentioned equation (3) respectively to calculate the third position offset (delta_x_3, delta_y_3). Further, the first, second and third position offsets are summed to calculate the current position offset (delta_x, delta_y) of the mobile station. Finally, the initial coordinate position (x, y) and the current position offset (delta_x, delta_y) of the mobile station are summed to calculate the current coordinate position (x+delta_x, y+delta_y) of the mobile station, and the current coordinate position is output as the new initial coordinate position (x, y) of the mobile station.

The calculation is performed by analogy.

When the coordinate position of the mobile station is calculated for the nth time, an nth piece of data (9.010", (base_x2, base_y2), −70, j2) is read from the above-mentioned received data, the current receiver j2 is determined according to the read nth piece of data, and the coordinate position (base_x2, base_y2) and the current_RSSI value of −70 of the current receiver j2 are obtained from the read nth piece of data. The RSSI value received by the current receiver j2 for the previous time is further acquired. The coordinate position and the RSSI value of the receiver corresponding to each piece of received data in the predetermined historical duration (1s) before the time (9.010") when the wireless signal is received by the current receiver j2 for the current time are acquired. As such, the received data in the predetermined historical duration in this calculation only includes the second piece of received data to the (n−1)th piece of received data. Because a time interval between the reception time (8.000") of the wireless signal of the first piece of received data and the time (9.010") when the wireless signal is received by the current receiver j2 for the current time exceeds the predetermined historical duration (1s), the influence of the RSSI received by the receiver j1 at 8.000" on the displacement of the mobile station is not required to be considered during the calculation of the third position offset (delta_x_3, delta_y_3). The nth calculation process of the coordinate position is similar to the fourth calculation process of the coordinate position, and is not repeated herein.

By cycling the calculation in this way, new coordinate positions of the mobile station are output continuously to locate the mobile station.

It should be noted that, in practical applications, all the above-mentioned optional examples may be combined in any way to form optional examples of the present disclosure, which are not repeated herein one by one.

Figure 2:
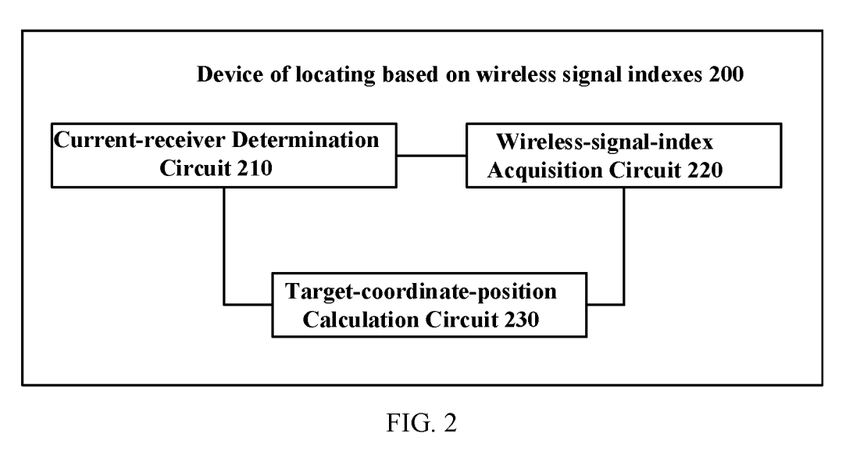
FIG. 2 shows a schematic structural diagram of a device of positioning based on wireless signal indexes according to one example of the present disclosure.

Based on the same inventive concept, the example of the present disclosure further provides a device of positioning based on wireless signal indexes, which is configured to support the method of positioning based on wireless signal indexes according to any one of the above-mentioned examples or combinations thereof. FIG. 2 shows a schematic structural diagram of a device 200 of positioning based on wireless signal indexes according to one example of the present disclosure. Referring to FIG. 2, the device 200 may at least include a current-receiver determination circuit 210, a wireless-signal-index acquisition circuit 220 and a target-coordinate-position calculation circuit 230.

Functions of components or elements and connection relationships among the components of the device 200 of positioning based on the wireless signal indexes according to the example of the present disclosure will be described now.

The current-receiver determination circuit 210 is applicable for reading a piece of received data in an order of wireless signal reception time from received data generated by one or more receivers receiving the wireless signals sent by a target to be located, and taking a receiver and a wireless signal index corresponding to the received data as a current receiver and a wireless signal index received by the current receiver for a current time.

The wireless-signal-index acquisition circuit 220 is connected with the current-receiver determination circuit 210, and applicable for acquiring a wireless signal index when the current receiver receives the wireless signal sent by the target to be located for a previous time and acquiring a wireless signal index when each of all the receivers receives the wireless signal sent by the target to be located every time in a predetermined historical duration before the time when the current receiver receives the wireless signal for the current time.

The target-coordinate-position calculation circuit 230 is connected with the current-receiver determination circuit 210 and the wireless-signal-index acquisition circuit 220 respectively, and applicable for calculating a current coordinate position of the target to be located according to a preset correlation between the wireless signal index and a distance between the target to be located and the receiver, a coordinate position of the current receiver, the wireless signal indexes received by the current receiver for the current time and for the previous time, the wireless signal indexes received by all the receivers in the predetermined historical duration, coordinate positions of these receivers and a coordinate position of the target to be located calculated for a previous time.

The above-mentioned wireless signal is broadcast to the one or more receivers by the target to be located at a specified period. The predetermined historical duration may be set within the range of 1s to 5s, preferably the range of 1s to 3s, thereby ensuring that the amount of the data in the predetermined historical duration is within a reasonable range under the premise of sufficiently considering the wireless signal indexes received by other receivers in the vicinity.

Preferably, a received signal strength indication (RSSI) of the wireless signal may be used as the wireless signal index.

Further, when the RSSI serves as the wireless signal index, the preset correlation between the wireless signal index and the distance between the target to be located and the receiver includes a minimum distance between the target to be located and the receiver, an RSSI upper limit value corresponding to the minimum distance, a maximum distance between the target to be located and the receiver as well as a RSSI lower limit value corresponding to the maximum distance, and the minimum distance is set to zer0. The maximum distance, the RSSI upper limit value and the RSSI lower limit value are related to transmission power and frequency of the wireless signal.

Figure 3:
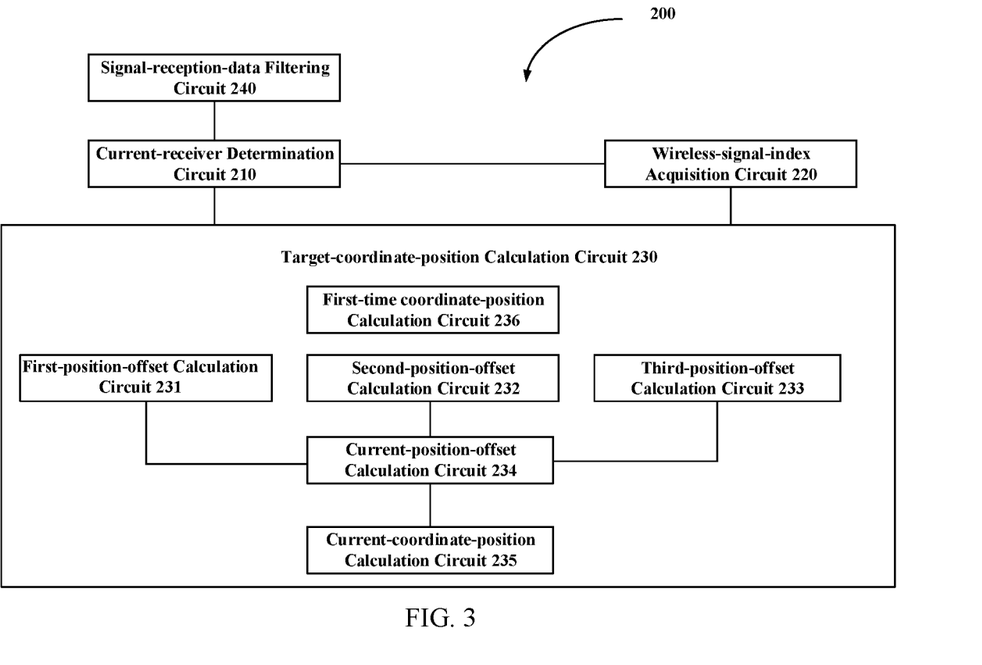
FIG. 3 shows a schematic structural diagram of a device of positioning based on wireless signal indexes according to another example of the present disclosure.

Further, as shown in FIG. 3, the device 200 may further include a signal-reception-data filtering circuit 240 which may be connected with the current-receiver determination circuit 210 and applicable for filtering the received data generated by the one or more receivers receiving the wireless signals sent by the target to be located, so as to discard the received data with an RSSI value greater than the RSSI upper limit value or less than the RSSI lower limit value, thus guaranteeing the validity of the data.

In an example, referring to FIG. 3, the target-coordinate-position calculation circuit 230 may include the following circuits: a first-position-offset calculation circuit 231 applicable for calculating a first position offset of the target to be located caused by the RSSI received by the current receiver for the current time according to the preset correlation between the wireless signal index and the distance between the target to be located and the receiver, the coordinate position of the current receiver, the RSSI received by the current receiver for the current time, the coordinate position of the target to be located calculated for the previous time and a preset weight of influence of the RSSI received by the current receiver for the current time on the position offset of the target to be located; a second-position-offset calculation circuit 232 applicable for calculating a second position offset of the target to be located caused by the RSSI received by the current receiver for the previous time according to the coordinate position of the current receiver, the RSSIs received by the current receiver for the current time and for the previous time, the coordinate position of the target to be located calculated for the previous time and a preset weight of influence of the RSSI received by the current receiver for the previous time on the position offset of the target to be located; a third-position-offset calculation circuit 233 applicable for calculating a third position offset of the target to be located caused by the RSSIs received by all the receivers in the predetermined historical duration according to the preset correlation between the wireless signal index and the distance between the target to be located and the receiver, the RSSIs received by all the receivers in the predetermined historical duration, the coordinate positions of these receivers, the coordinate position of the target to be located calculated for the previous time, and a preset weight of influence of the RSSIs received by all the receivers in the predetermined historical duration on the position offset of the target to be located; a current-position-offset calculation circuit 234 connected with the first-position-offset calculation circuit 231, the second-position-offset calculation circuit 232 and the third-position-offset calculation circuit 233 respectively, and applicable for summing the first, second and third position offsets to obtain a current position offset of the target to be located; and a current-coordinate-position calculation circuit 235 connected with the current-position-offset calculation circuit 234, and applicable for summing the coordinate position of the target to be located calculated for the previous time and the current position offset to obtain the current coordinate position of the target to be located.

Further preferably, the first-position-offset calculation circuit 231 is further applicable for calculating the first position offset (delta_x_1, delta_y_1) of the target to be located caused by the RSSI received by the current receiver for the current time according to the following equation (1):

$$\text{delta\_x\_1} = (\text{base1\_x} - x) \times ((\text{RSSI upper limit value} - \text{current\_RSSI})/(\text{RSSI upper limit value} - \text{RSSI lower limit value}))^2 \times w1,$$

$$\text{delta\_y\_1} = (\text{base1\_y} - y) \times ((\text{RSSI upper limit value} - \text{current\_RSSI})/(\text{RSSI upper limit value} - \text{RSSI lower limit value}))^2 \times w1.$$

In the above equation (1), base1_x and base1_y are the coordinate position of the current receiver, x and y are the coordinate position of the target to be located calculated for the previous time, and w1 is the weight of influence of the RSSI received by the current receiver for the current time on the position offset of the target to be located.

The second-position-offset calculation circuit 232 is further applicable for calculating the second position offset (delta_x_2, delta_y_2) of the target to be located caused by the RSSI received by the current receiver for the previous time according to the following equation (2):

$$\text{delta\_x\_2} = (\text{base1\_x} - x) \times (\text{current\_RSSI} - \text{previous\_RSSI}) \times w2,$$

$$\text{delta\_y\_2} = (\text{base1\_y} - y) \times (\text{current\_RSSI} - \text{previous\_RSSI}) \times w2.$$

The above equation (2) has the same meanings of base1_x, base1_y, x and y as the equation (1), and w2 is the weight of influence of the RSSI received by the current receiver for the previous time on the position offset of the target to be located.

The third-position-offset calculation circuit 233 is further applicable for calculating the third position offset (delta_x_3, delta_y_3) of the target to be located caused by the RSSIs received by all the receivers in the predetermined historical duration according to the following equation (3):

$$\text{delta\_x\_\#} = (\text{base\#\_x} - x) \times ((\text{RSSI upper limit value} - \text{RSSI\_\#})/(\text{RSSI upper limit value} - \text{RSSI lower limit value}))^2 \times w1,$$

$$\text{delta\_y\_\#} = (\text{base\#\_y} - y) \times ((\text{RSSI upper limit value} - \text{RSSI\_\#})/(\text{RSSI upper limit value} - \text{RSSI lower limit value}))^2 \times w1,$$

$$\text{delta\_x\_3} = (\text{sum of all delta\_x\_\#}) \times w3,$$

$$\text{delta\_y\_3} = (\text{sum of all delta\_y\_\#}) \times w3.$$

In the above equation (3), delta_x_#, delta_y_# and RSSI_# are the coordinate position of a receiver corresponding to each piece of received data and the RSSI value received by the receiver in the predetermined historical duration, x and y are the coordinate position of the target to be located calculated for the previous time, and w3 is the weight of influence of the RSSIs received by all the receivers in the predetermined historical duration on the position offset of the target to be located.

The current-position-offset calculation circuit 234 is further applicable for calculating the current position offset (delta_x, delta_y) of the target to be located according to the following equation (4):

$$delta\_x = delta\_x\_1 + delta\_x\_2 + delta\_x\_3,$$

$$delta\_y = delta\_y\_1 + delta\_y\_2 + delta\_y\_3.$$

The current-coordinate-position calculation circuit 235 is further applicable for calculating the current coordinate position (x+delta_x, y+delta_y) of the target to be located and outputting the current coordinate position to obtain a new position of the target to be located. X and y are the coordinate position of the target to be located calculated for the previous time.

In order to obtain high positioning precision, preferably, w1 is set within the range of 0.5 to 0.7, w2 is set within the range of 0.004 to 0.007, and w3 is set within the range of 0.04 to 0.06.

In an optional example, the second-position-offset calculation circuit 232 is further applicable for setting the second position offset to zero in the case where the RSSI received by the current receiver for the current time is the RSSI received by the current receiver for the first time.

In an optional example, still referring to FIG. 3, the target-coordinate-position calculation circuit 230 may further include a first-time coordinate-position calculation circuit 236 which is applicable for calculating a circle radius r=((RSSI upper limit value−current_RSSI)/(RSSI upper limit value−RSSI lower limit value))×maximum distance when the coordinate position of the target to be located is calculated for the first time, so as to obtain a circle with the coordinate position (base1_x, base1_y) of the current receiver as a center of the circle and the radius of r, and then selecting a coordinate position at the circle randomly as the current coordinate position of the target to be located.

Further, the first-time coordinate-position calculation circuit 236 is further applicable for: selecting a point at the circle randomly, and determining an included angle $\alpha_{random}$ formed by a radius passing through the point and an x axis of a coordinate system; calculating a relative distance between the point and a center of the circle: delta_x_random=r×cos($\alpha_{random}$), and delta_y_random=r×sin($\alpha_{random}$); calculating the coordinate position (x_random, y_random) of the point: x_random=base1_x+delta_x_random, and y_random=base1_y+delta_y_random; and taking the coordinate position (x_random, y_random) of the point as the current coordinate position of the target to be located.

According to any one or combinations of the above-mentioned optional examples, the example of the present disclosure may achieve the following beneficial effects.

The method and device of positioning based on the wireless signal indexes according to the example of the present disclosure, take the wireless signals sent by the target to be located and received by all the receivers as inputs in sequence, and comprehensively consider the influence of the wireless signal indexes received by the current receiver for the current time and for the previous time as well as the wireless signal indexes received by all the receivers in the predetermined historical duration during the positioning calculation, so as to obtain the current coordinate position of the target to be located. The solution according to the example of the present disclosure is applicable for both discrete wireless signals and continuous wireless signals, and solves the problem that the positioning method based on wireless signal indexes in the prior art is unable to be applicable for the discrete wireless signal scene. Meanwhile, the solution according to the example of the present disclosure is easy to implement and has the high positioning precision.

Further, by properly setting different weights of the influence of the wireless signal indexes received by the current receiver for the current time and for the previous time as well as the wireless signal indexes received by all the receivers in the predetermined historical duration on the displacement of the target to be located, the position offset of the target to be located is calculated to further calculate the current coordinate position of the target to be located, which may further improve the positioning precision.

A method and a device of positioning based on wireless signal indexes is provided by the present disclosure.

According to one respect of the examples of the present disclosure, a method of positioning based on wireless signal indexes is provided and comprises: reading a piece of received data in an order of wireless signal reception time from received data generated by one or more receivers receiving the wireless signals sent by a target to be located, and taking a receiver and a wireless signal index corresponding to the received data as a current receiver and a wireless signal index received by the current receiver for a current time; acquiring a wireless signal index when the current receiver receives the wireless signal sent by the target to be located for a previous time; acquiring a wireless signal index when each of all the receivers receives the wireless signal sent by the target to be located every time in a predetermined historical duration before the time when the current receiver receives the wireless signal for the current time; and calculating a current coordinate position of the target to be located according to a preset correlation between the wireless signal index and a distance between the target to be located and the receiver, a coordinate position of the current receiver, the wireless signal index received by the current receiver for the current time and the wireless signal index received by the current receiver for the previous time, the wireless signal indexes received by all the receivers in the predetermined historical duration, coordinate positions of these receivers and a coordinate position of the target to be located calculated for a previous time. The wireless signal is broadcast to the one or more receivers by the target to be located at a specified period.

Optionally, the wireless signal index is a received signal strength indication (RSSI) of the wireless signal.

Optionally, the preset correlation between the wireless signal index and the distance between the target to be located and the receiver comprises a minimum distance between the target to be located and the receiver, an RSSI upper limit value corresponding to the minimum distance, a maximum distance between the target to be located and the receiver as well as a RSSI lower limit value corresponding to the maximum distance, and the minimum distance is zero.

Optionally, the method further comprises: filtering the received data generated by the one or more receivers receiving the wireless signals sent by the target to be located, to discard the received data with an RSSI value greater than the RSSI upper limit value or less than the RSSI lower limit value.

Optionally, calculating the current coordinate position of the target to be located according to the preset correlation between the wireless signal index and the distance between the target to be located and the receiver, the coordinate position of the current receiver, the wireless signal index received by the current receiver for the current time and the wireless signal index received by the current receiver for the previous time, the wireless signal indexes received by all the receivers in the predetermined historical duration, the coordinate positions of these receivers and a coordinate position of the target to be located calculated for the previous time comprises: calculating a first position offset of the target to be located caused by the RSSI received by the current receiver for the current time according to the preset correlation between the wireless signal index and the distance between the target to be located and the receiver, the coordinate position of the current receiver, the RSSI received by the current receiver for the current time, the coordinate position of the target to be located calculated for the previous time and a preset weight of influence of the RSSI received by the current receiver for the current time on the position offset of the target to be located; calculating a second position offset of the target to be located caused by the RSSI received by the current receiver for the previous time according to the coordinate position of the current receiver, the RSSIs received by the current receiver for the current time and for the previous time, the coordinate position of the target to be located calculated for the previous time and a preset weight of influence of the RSSI received by the current receiver for the previous time on the position offset of the target to be located; calculating a third position offset of the target to be located caused by the RSSIs received by all the receivers in the predetermined historical duration according to the preset correlation between the wireless signal index and the distance between the target to be located and the receiver, the RSSIs received by all the receivers in the predetermined historical duration, the coordinate positions of these receivers, the coordinate position of the target to be located calculated for the previous time, and a preset weight of influence of the RSSIs received by all the receivers in the predetermined historical duration on the position offset of the target to be located; summing the first, second and third position offsets to obtain a current position offset of the target to be located; and summing the coordinate position of the target to be located calculated for the previous time and the current position offset to obtain the current coordinate position of the target to be located.

Optionally, the first position offset (delta_x_1, delta_y_1) of the target to be located caused by the RSSI received by the current receiver for the current time is calculated according to the following equation: delta_x_1=(base1_x−x)×((RSSI upper limit value−current_RSSI)/(RSSI upper limit value−RSSI lower limit value))2×w1, and delta_y_1=(base1_y−y)×((RSSI upper limit value−current_RSSI)/(RSSI upper limit value−RSSI lower limit value))2×w1; the second position offset (delta_x_2, delta_y_2) of the target to be located caused by the RSSI received by the current receiver for the previous time is calculated according to the following equation: delta_x_2=(base1_x−x)×(current_RSSI−previous_RSSI)×w2, and delta_y_2=(base1_y−y)×(current_RSSI−previous_RSSI)×w2; the third position offset (delta_x_3, delta_y_3) of the target to be located caused by the RSSIs received by all the receivers in the predetermined historical duration is calculated according to the following equation: delta_x_3=(sum of all delta_x_#)×w3, delta_y_3=(sum of all delta_y_#)×w3, delta_x_#=(base#_x−x)×((RSSI upper limit value−RSSI_#)/(RSSI upper limit value−RSSI lower limit value))2×w1, and delta_y_#=(base#_y−y)×((RSSI upper limit value−RSSI_#)/(RSSI upper limit value−RSSI lower limit value))2×w1, the current position offset (delta_x, delta_y) of the target to be located is calculated according to the following equation: delta_x=delta_x_1+delta_x_2+delta_x_3, and delta_y=delta_y_1+delta_y_2+delta_y_3; and the current coordinate position (x+delta_x, y+delta_y) of the target to be located is calculated. Base1_x and base1_y are the coordinate position of the current receiver, x and y are the coordinate position of the target to be located calculated for the previous time, delta_x_#, delta_y_# and RSSI_# are the coordinate position of the receiver corresponding to each piece of received data and the RSSI value received by the receiver in the predetermined historical duration, w1 is the weight of influence of the RSSI received by the current receiver for the current time on the position offset of the target to be located, w2 is the weight of influence of the RSSI received by the current receiver for the previous time on the position offset of the target to be located, and w3 is the weight of influence of the RSSIs received by all the receivers in the predetermined historical duration on the position offset of the target to be located.

Optionally, the second position offset is set to zero if the RSSI received by the current receiver for the current time serves as the RSSI received by the current receiver for the first time.

Optionally, w1 is within a range of 0.5 to 0.7; w2 is within a range of 0.004 to 0.007; and w3 is within a range of 0.04 to 0.06.

Optionally, the method further comprises: calculating a circle radius r=((RSSI upper limit value−current_RSSI)/(RSSI upper limit value−RSSI lower limit value))×maximum distance in a case where the coordinate position of the target to be located is calculated for the first time, so as to obtain a circle with the coordinate position (base1_x, base1_y) of the current receiver as a center of the circle and the circle radius of r; and selecting a coordinate position at the circle randomly as the current coordinate position of the target to be located.

Optionally, selecting the coordinate position at the circle randomly as the current coordinate position of the target to be located comprises: selecting a point at the circle randomly, and determining an included angle αrandom between a radius passing through the point and an x axis of a coordinate system; calculating a relative distance between the point and a center of the circle: delta_x_random=r×cos(αrandom), and delta_y_random=r×sin(αrandom); calculating a coordinate position (x_random, y_random) of the point: x_random=base1_x+delta_x_random, and y_random=base1_y+delta_y_random; and taking the coordinate position (x_random, y_random) of the point as the current coordinate position of the target to be located.

Optionally, the predetermined historical duration ranges from 1 s to 5 s.

According to another respect of the examples of the present disclosure, a device of positioning based on wireless signal indexes is provided and comprises: a current-receiver determination circuit, applicable for reading a piece of received data in an order of wireless signal reception time from received data generated by one or more receivers receiving the wireless signals sent by a target to be located, and taking a receiver and a wireless signal index corresponding to the received data as a current receiver and a wireless signal index received by the current receiver for a current time; a wireless-signal-index acquisition circuit, applicable for acquiring a wireless signal index when the current receiver receives the wireless signal sent by the target to be located for a previous time, and acquiring a wireless signal index when each of all the receivers receives the wireless signal sent by the target to be located every time in a predetermined historical duration before the time when the current receiver receives the wireless signal for the current time; and a target-coordinate-position calculation circuit, applicable for calculating a current coordinate position of the target to be located according to a preset correlation between the wireless signal index and a distance between the target to be located and the receiver, a coordinate position of the current receiver, the wireless signal indexes received by the current receiver for the current time and for the previous time, the wireless signal indexes received by all the receivers in the predetermined historical duration, coordinate positions of these receivers and a coordinate position of the target to be located calculated for a previous time. The wireless signal is broadcast to the one or more receivers by the target to be located at a specified period.

Optionally, the wireless signal index is a received signal strength indication (RSSI) of the wireless signal.

Optionally, the preset correlation between the wireless signal index and the distance between the target to be located and the receiver comprises a minimum distance between the target to be located and the receiver, an RSSI upper limit value corresponding to the minimum distance, a maximum distance between the target to be located and the receiver as well as a RSSI lower limit value corresponding to the maximum distance, and the minimum distance is zero.

Optionally, the device further comprises: a signal-reception-data filtering circuit, applicable for filtering the received data generated by the one or more receivers receiving the wireless signals sent by the target to be located to discard the received data with an RSSI value greater than the RSSI upper limit value or less than the RSSI lower limit value.

Optionally, the target-coordinate-position calculation circuit comprises: a first-position-offset calculation circuit, applicable for calculating a first position offset of the target to be located caused by the RSSI received by the current receiver for the current time according to the preset correlation between the wireless signal index and the distance between the target to be located and the receiver, the coordinate position of the current receiver, the RSSI received by the current receiver for the current time, the coordinate position of the target to be located calculated for the previous time and a preset weight of influence of the RSSI received by the current receiver for the current time on the position offset of the target to be located; a second-position-offset calculation circuit applicable for calculating a second position offset of the target to be located caused by the RSSI received by the current receiver for the previous time according to the coordinate position of the current receiver, the RSSIs received by the current receiver for the current time and for the previous time, the coordinate position of the target to be located calculated for the previous time and a preset weight of influence of the RSSI received by the current receiver for the previous time on the position offset of the target to be located; a third-position-offset calculation circuit applicable for calculating a third position offset of the target to be located caused by the RSSIs received by all the receivers in the predetermined historical duration according to the preset correlation between the wireless signal index and the distance between the target to be located and the receiver, the RSSIs received by all the receivers in the predetermined historical duration, the coordinate positions of these receivers, the coordinate position of the target to be located calculated for the previous time, and a preset weight of influence of the RSSIs received by all the receivers in the predetermined historical duration on the position offset of the target to be located; a current-position-offset calculation circuit, applicable for summing the first, second and third position offsets to obtain a current position offset of the target to be located; and a current-coordinate-position calculation circuit, applicable for summing the coordinate position of the target to be located calculated for the previous time and the current position offset to obtain the current coordinate position of the target to be located.

Optionally, the first-position-offset calculation circuit is further applicable for calculating the first position offset (delta_x_1, delta_y_1) of the target to be located caused by the RSSI received by the current receiver for the current time according to the following equation: delta_x_1=(base1_x−x)×((RSSI upper limit value−current_RSSI)/(RSSI upper limit value−RSSI lower limit value))2×w1, and delta_y_1=(base1_y−y)×((RSSI upper limit value−current_RSSI)/(RSSI upper limit value−RSSI lower limit value))2×w1; the second-position-offset calculation circuit is further applicable for calculating the second position offset (delta_x_2, delta_y_2) of the target to be located caused by the RSSI received by the current receiver for the previous time according to the following equation: delta_x_2=(base1_x−x)×(current_RSSI−previous_RSSI)×w2, and delta_y_2=(base1_y−y)×(current_RSSI−previous_RSSI)×w2; the third-position-offset calculation circuit is further applicable for calculating the third position offset (delta_x_3, delta_y_3) of the target to be located caused by the RSSIs received by all the receivers in the predetermined historical duration according to the following equation: delta_x_3=(sum of all delta_x_#)×w3, delta_y_3=(sum of all delta_y_#)×w3, delta_x_#=(base#_x−x)×((RSSI upper limit value−RSSI_#)/(RSSI upper limit value−RSSI lower limit value))2×w1, and delta_y_#=(base#_y−y)×((RSSI upper limit value−RSSI_#)/(RSSI upper limit value−RSSI lower limit value))2×w1; the current-position-offset calculation circuit is further applicable for calculating the current position offset (delta_x, delta_y) of the target to be located according to the following equation: delta_x=delta_x_1+delta_x_2+delta_x_3, and delta_y=delta_y_1+delta_y_2+delta_y_3; and the current-coordinate-position calculation circuit is further applicable for calculating the current coordinate position (x+delta_x, y+delta_y) of the target to be located. Base1_x and base1_y are the coordinate positions of the current receiver, x and y are the coordinate positions of the target to be located calculated for the previous time, delta_x_#, delta_y_# and RSSI_# are the coordinate positions of the receiver corresponding to each piece of received data and the RSSI value received by the receiver in the predetermined historical duration, w1 is the weight of influence of the RSSI received by the current receiver for the current time on the position offset of the target to be located, w2 is the weight of influence of the RSSI received by the current receiver for the previous time on the position offset of the target to be located, and w3 is the weight of influence of the RSSIs received by all the receivers in the predetermined historical duration on the position offset of the target to be located.

Optionally, the second-position-offset calculation circuit is further applicable for: setting the second position offset to zero in a case where the RSSI received by the current receiver for the current time is the RSSI received by the current receiver for the first time.

Optionally, the target-coordinate-position calculation circuit further comprises: a first-time coordinate-position calculation circuit, applicable for calculating a circle radius r=((RSSI upper limit value−current_RSSI)/(RSSI upper limit value−RSSI lower limit value))×maximum distance in a case where the coordinate position of the target to be located is calculated for the first time, so as to obtain a circle with the coordinate position (base1_x, base1_y) of the current receiver as a center of the circle and the circle radius of r; and selecting a coordinate position at the circle randomly as the current coordinate position of the target to be located.

The method of positioning based on the wireless signals indexes according to the example of the present disclosure, takes the wireless signals sent by the target to be located and received by all the receivers as inputs in sequence, and comprehensively considers influence of the wireless signal indexes received by the current receiver for the current time and for the previous time as well as the wireless signal indexes received by all the receivers in the predetermined historical duration during positioning calculation, so as to obtain the current coordinate position of the target to be located. The solution according to the example of the present disclosure is applicable for both discrete wireless signals and continuous wireless signals, and solves the problem that a positioning method based on wireless signal indexes in a prior art is unable to be applicable for a discrete wireless signal scene. Meanwhile, the solution according to the example of the present disclosure is easy to implement and has a high positioning precision.

Moreover, by properly setting different weights of influence of the wireless signal indexes received by the current receiver for the current time and for the previous time as well as the wireless signal indexes received by all the receivers in the predetermined historical duration on displacement of the target to be located, the position offset of the target to be located is calculated to further calculate the current coordinate position of the target to be located, which may further improve the positioning precision.

It may be clearly understood by a person skilled in the art that, for a detailed working process of the foregoing system, device and unit, the corresponding process in the foregoing method examples may be referred to, and for the sake of brevity, the details will not be described herein again.

In addition, functional units in the examples of the present disclosure may be independent from one another physically, or two or more functional units may be integrated, or all functional units may be integrated in one processing unit. The integrated functional unit may be implemented in a form of hardware, or may be implemented in a form of software or firmware.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Those skilled in the art may understand that in the case where the integrated functional unit is implemented in a form of software and sold or used as an independent product, the integrated functional unit may be stored in a computer-readable storage medium. Based on such an understanding, the technical solution of the present disclosure essentially, or all or a part of the technical solution may be implemented in a form of a software product. The computer software product is stored in a storage medium, and includes several instructions for instructing a computing device (for example, a personal computer, a server, a network device, or the like) to perform all or part of the steps of the methods described in the examples of the present disclosure when executing the instructions. The foregoing storage medium includes: any medium that can store a program code, such as a USB flash disk, a removable hard disk, a read-only memory (ROM), a random access memory (RAM), a magnetic disk, or an optical disk.

Alternatively, all or part of the steps of the foregoing method examples may be implemented by hardware (e.g. a computing device, such as a personal computer, a server, a network device, or the like) related to program instructions, and the hardware may be stored in a computer-readable storage medium, and when the program instructions are executed by a processor of the computing device, the computing device executes all or part of the steps of the method according to the examples of the present disclosure.

Finally, it should be noted that the foregoing examples are merely intended for describing the technical solutions of the present disclosure rather than limiting the present disclosure. Although the present disclosure is described in detail with reference to the foregoing examples, persons of ordinary skill in the art should understand that they may still make modifications to the technical solutions recorded in the foregoing examples or make equivalent replacements to part or all of technical features of the technical solutions recorded in the foregoing examples; however, these modifications or replacements do not make the corresponding technical solutions depart from the protection scope of the present disclosure.

What is claims is:

1. A method of positioning based on wireless signal indexes, comprising:
    reading a piece of received data in an order of wireless signal reception time from the received data generated by one or more receivers that receive the wireless signals sent by a target to be located, and taking a receiver and a wireless signal index corresponding to the received data as a current receiver and the wireless signal index received by the current receiver for a current time;
    acquiring a wireless signal index when the current receiver receives the wireless signal sent by the target to be located for a previous time;
    acquiring a wireless signal index when each of all the receivers receives the wireless signal sent by the target to be located every time in a predetermined historical duration before a time when the current receiver receives the wireless signal for the current time; and
    calculating a current coordinate position of the target to be located according to a preset correlation between the wireless signal index and a distance between the target to be located and the receiver, a coordinate position of the current receiver, the wireless signal index received by the current receiver for the current time and the wireless signal index received by the current receiver for the previous time, the wireless signal indexes received by all the receivers in the predetermined historical duration, coordinate positions of these receivers and a coordinate position of the target to be located calculated for a previous time, wherein the wireless signal is broadcast to the one or more receivers by the target to be located at a specified period, and wherein the preset correlation between the wireless signal index and the distance between the target to be located and the receiver comprises a minimum distance between the target to be located and the receiver, a received signal strength indication (RSSI) upper limit value corresponding to the minimum distance, a maximum distance between the target to be located and the receiver as well as an RSSI lower limit value corresponding to the maximum distance.

2. The method according to claim 1, wherein the wireless signal index is an RSSI of the wireless signal.

3. The method according to claim 2, wherein the minimum distance is zero.

4. The method according to claim 3, further comprising:
filtering the received data generated by the one or more receivers receiving the wireless signals sent by the target to be located, to discard the received data with an RSSI value greater than the RSSI upper limit value or less than the RSSI lower limit value.

5. The method according to claim 3, wherein calculating the current coordinate position of the target to be located comprises:
calculating a first position offset of the target to be located caused by the RSSI received by the current receiver for the current time according to the preset correlation between the wireless signal index and the distance between the target to be located and the receiver, the coordinate position of the current receiver, the RSSI received by the current receiver for the current time, the coordinate position of the target to be located calculated for the previous time and a preset weight of influence of the RSSI received by the current receiver for the current time on the position offset of the target to be located;
calculating a second position offset of the target to be located caused by the RSSI received by the current receiver for the previous time according to the coordinate position of the current receiver, RSSIs received by the current receiver for the current time and for the previous time, the coordinate position of the target to be located calculated for the previous time and a preset weight of influence of the RSSI received by the current receiver for the previous time on the position offset of the target to be located;
calculating a third position offset of the target to be located caused by the RSSIs received by all the receivers in the predetermined historical duration according to the preset correlation between the wireless signal index and the distance between the target to be located and the receiver, the RSSIs received by all the receivers in the predetermined historical duration, the coordinate positions of these receivers, the coordinate position of the target to be located calculated for the previous time, and a preset weight of influence of the RSSIs received by all the receivers in the predetermined historical duration on the position offset of the target to be located;
summing the first, second and third position offsets to obtain a current position offset of the target to be located; and summing the coordinate position of the target to be located calculated for the previous time and the current position offset to obtain the current coordinate position of the target to be located.

6. The method according to claim 5, wherein:
the first position offset identified as (delta_x_1, delta_y_1) of the target to be located caused by the RSSI received by the current receiver for the current time is calculated according to the following equation:

delta_x_1=(base1_x−x)×((RSSI upper limit value−current_RSSI)/(RSSI upper limit value−RSSI lower limit value))$^2$×w1, and delta_y_1=(base1_y−y)×((RSSI upper limit value−current_RSSI)/(RSSI upper limit value−RSSI lower limit value))$^2$×w1;

the second position offset identified as (delta_x_2, delta_y_2) of the target to be located caused by the RSSI received by the current receiver for the previous time is calculated according to the following equation:

delta_x_2=(base1_x−x)×(current_RSSI−previous_RSSI)×w2, and delta_y_2=(base1_y−y)×(current_RSSI−previous_RSSI)×w2;

the third position offset identified as (delta_x_3, delta_y_3) of the target to be located caused by the RSSIs received by all the receivers in the predetermined historical duration is calculated according to the following equation:

delta_x_3=(sum of all delta_x_#)×w3, delta_y_3=(sum of all delta_y_#)×w3, delta_x_#=(base#x−x)×((RSSI upper limit value−RSSI_#)/(RSSI upper limit value−RSSI lower limit value))$^2$×w1, and delta_y_#=(base#_y−y)×((RSSI upper limit value−RSSI_#)/(RSSI upper limit value−RSSI lower limit value))$^2$×w1, the current position offset identified as (delta_x, delta_y) of the target to be located is calculated according to the following equation:

delta_x=delta_x_1+delta_x_2+delta_x_3, and delta_y=delta_y_1+delta_y_2+delta_y_3; and the current coordinate position identified as (x+delta_x, y+delta_y) of the target to be located is calculated;
wherein base1_x and base1_y are the coordinate position of the current receiver, x and y are the coordinate position of the target to be located calculated for the previous time, delta_x_#, delta_y_# and RSSI_# are the coordinate position of the receiver corresponding to each piece of received data and the RSSI value received by the receiver in the predetermined historical duration, w1 is the weight of influence of the RSSI received by the current receiver for the current time on the position offset of the target to be located, w2 is the weight of influence of the RSSI received by the current receiver for the previous time on the position offset of the target to be located, and w3 is the weight of influence of the RSSIs received by all the receivers in the predetermined historical duration on the position offset of the target to be located.

7. The method according to claim 5, wherein the second position offset is set to zero when the RSSI received by the current receiver for the current time serves is the RSSI received by the current receiver for the first time.

8. The method according to claim 6, wherein
w1 is within a range of 0.5 to 0.7;
w2 is within a range of 0.004 to 0.007; and
w3 is within a range of 0.04 to 0.06.

9. The method according to claim 6, further comprising:
calculating a circle radius: r=((RSSI upper limit value−current_RSSI)/(RSSI upper limit value−RSSI lower limit value))×maximum distance in a case where the coordinate position of the target to be located is calculated for the first time, so as to obtain a circle with the coordinate position identified as (base1_x, base1_y) of the current receiver as a center of the circle and the circle radius of r; and
selecting a coordinate position at the circle randomly as the current coordinate position of the target to be located.

10. The method according to claim 9, wherein selecting the coordinate position at the circle randomly as the current coordinate position of the target to be located comprises:
selecting a point at the circle randomly, and determining an angle $\alpha_{random}$ between a radius passing through the point and an x axis of a coordinate system;
calculating a relative distance between the point and a center of the circle: delta_x_random=r×cos($\alpha_{random}$), and delta_y_random=r×sin($\alpha_{random}$);
calculating a coordinate position (x_random, y_random) of the point: x_random=base1_x+delta_x_random, and y_random=base1_y+delta_y_random; and
taking the coordinate position (x_random, y_random) of the point as the current coordinate position of the target to be located.

11. The method according to claim 1, wherein the predetermined historical duration ranges from 1 s to 5 s.

12. A device of positioning based on wireless signal indexes comprising:
a current-receiver determination circuit that is configured to read a piece of received data in an order of wireless signal reception time from the received data generated by one or more receivers that receive the wireless signals sent by a target to be located, and take a receiver and a wireless signal index corresponding to the received data as a current receiver and the wireless signal index received by the current receiver for a current time;
a wireless-signal-index acquisition circuit is configured to acquire a wireless signal index when the current receiver receives the wireless signal sent by the target to be located for a previous time, and acquire a wireless signal index when each of all the receivers receives the wireless signal sent by the target to be located every time in a predetermined historical duration before a time when the current receiver receives the wireless signal for the current time; and
a target-coordinate-position calculation circuit is configured to calculate a current coordinate position of the target to be located according to a preset correlation between the wireless signal index and a distance between the target to be located and the receiver, a coordinate position of the current receiver, the wireless signal indexes received by the current receiver for the current time and for the previous time, the wireless signal indexes received by all the receivers in the predetermined historical duration, coordinate positions of these receivers and a coordinate position of the target to be located calculated for a previous time,
wherein the wireless signal is broadcast to the one or more receivers by the target to be located at a specified period, and
wherein the preset correlation between the wireless signal index and the distance between the target to be located and the receiver comprises a minimum distance between the target to be located and the receiver, a received signal strength indication (RSSI) upper limit value corresponding to the minimum distance, a maximum distance between the target to be located and the receiver as well as an RSSI lower limit value corresponding to the maximum distance.

13. The device according to claim 12, wherein the wireless signal index is an RSSI of the wireless signal.

14. The device according to claim 13, wherein the minimum distance is zero.

15. The device according to claim 14, further comprising:
a signal-reception-data filtering circuit is configured to filter the received data generated by the one or more receivers receiving the wireless signals sent by the target to be located to discard the received data with an RSSI value greater than the RSSI upper limit value or less than the RSSI lower limit value.

16. The device according to claim 14, wherein the target-coordinate-position calculation circuit comprises:
a first-position-offset calculation circuit is configured to calculate a first position offset of the target to be located caused by the RSSI received by the current receiver for the current time according to the preset correlation between the wireless signal index and the distance between the target to be located and the receiver, the coordinate position of the current receiver, the RSSI received by the current receiver for the current time, the coordinate position of the target to be located calculated for the previous time and a preset weight of influence of the RSSI received by the current receiver for the current time on the position offset of the target to be located;
a second-position-offset calculation circuit is configured to calculate a second position offset of the target to be located caused by the RSSI received by the current receiver for the previous time according to the coordinate position of the current receiver, RSSIs received by the current receiver for the current time and for the previous time, the coordinate position of the target to be located calculated for the previous time and a preset weight of influence of the RSSI received by the current receiver for the previous time on the position offset of the target to be located;
a third-position-offset calculation circuit is configured to calculate a third position offset of the target to be located caused by the RSSIs received by all the receivers in the predetermined historical duration according to the preset correlation between the wireless signal index and the distance between the target to be located and the receiver, the RSSIs received by all the receivers in the predetermined historical duration, the coordinate positions of these receivers, the coordinate position of the target to be located calculated for the previous time, and a preset weight of influence of the RSSIs received by all the receivers in the predetermined historical duration on the position offset of the target to be located;
a current-position-offset calculation circuit is configured to sum the first, second and third position offsets to obtain a current position offset of the target to be located; and a current-coordinate-position calculation circuit is configured to sum the coordinate position of the target to be located calculated for the previous time and the current position offset to obtain the current coordinate position of the target to be located.

17. The device according to claim 16, wherein:

the first-position-offset calculation circuit is further configured to calculate the first position offset identified as (delta_x_1, delta_y_1) of the target to be located caused by the RSSI received by the current receiver for the current time according to the following equation:

delta_$x$_1=(base1_$x$−$x$)×((RSSI upper limit value−current_RSSI)/(RSSI upper limit value−RSSI lower limit value))$^2$×$w$1, and delta_$y$_1=(base1_$y$−$y$)×((RSSI upper limit value−current_RSSI)/(RSSI upper limit value−RSSI lower limit value))$^2$×$w$1;

the second-position-offset calculation circuit is further configured to calculate the second position offset identified as (delta_x_2, delta_y_2) of the target to be located caused by the RSSI received by the current receiver for the previous time according to the following equation:

delta_$x$_2=(base1_$x$−$x$)×(current_RSSI−previous_RSSI)×$w$2, and delta_$y$_2=(base1_$y$−$y$)×(current_RSSI−previous_RSSI)×$w$2;

the third-position-offset calculation circuit is further configured to calculate the third position offset identified as (delta_x_3, delta_y_3) of the target to be located caused by the RSSIs received by all the receivers in the predetermined historical duration according to the following equation:

delta_$x$_3=(sum of all delta_$x$_#)×$w$3, delta_$y$_3=(sum of all delta_$y$_#)×$w$3, delta_$x$_#=(base#_$x$−$x$)×((RSSI upper limit value−RSSI_#)/(RSSI upper limit value−RSSI lower limit value))$^2$×$w$1, and delta_$y$_#=(base#_$y$−$y$)×((RSSI upper limit value−RSSI_#)/(RSSI upper limit value−RSSI lower limit value))$^2$×$w$1;

the current-position-offset calculation circuit is further configured to calculate the current position offset identified as (delta_x, delta_y) of the target to be located according to the following equation:

delta_$x$=delta_$x$_1+delta_$x$_2+delta_$x$_3, and delta_$y$=delta_$y$_1+delta_$y$_2+delta_$y$_3; and the current-coordinate-position calculation circuit is further configured to calculate the current coordinate position identified as (x+delta_x, y+delta_y) of the target to be located;

wherein base1_x and base1_y are the coordinate positions of the current receiver, x and y are the coordinate positions of the target to be located calculated for the previous time, delta_x_#, delta_y_# and RSSI_# are the coordinate positions of the receiver corresponding to each piece of received data and the RSSI value received by the receiver in the predetermined historical duration, w1 is the weight of influence of the RSSI received by the current receiver for the current time on the position offset of the target to be located, w2 is the weight of influence of the RSSI received by the current receiver for the previous time on the position offset of the target to be located, and w3 is the weight of influence of the RSSIs received by all the receivers in the predetermined historical duration on the position offset of the target to be located.

18. The device according to claim 16, wherein the second-position-offset calculation circuit is further configured to:
set the second position offset to zero in a case where the RSSI received by the current receiver for the current time is the RSSI received by the current receiver for the first time.

19. The device according to claim 17, wherein the target-coordinate-position calculation circuit further comprises:
a first-time coordinate-position calculation circuit that is configured to calculate a circle radius r=((RSSI upper limit value−current_RSSI)/(RSSI upper limit value−RSSI lower limit value))×maximum distance in a case where the coordinate position of the target to be located is calculated for the first time, so as to obtain a circle with the coordinate position (base1_x, base1_y) of the current receiver as a center of the circle and the circle radius of r; and selecting a coordinate position at the circle randomly as the current coordinate position of the target to be located.

\* \* \* \* \*